(12) United States Patent
Bouzmane

(10) Patent No.: US 8,601,806 B1
(45) Date of Patent: Dec. 10, 2013

(54) ELECTRIC HYDRAULIC MOTOR SYSTEM FOR LARGE VEHICLES

(76) Inventor: Mohammed Bouzmane, Columbus, OH (US)

( * ) Notice: Subject to any disclaimer, the term of this patent is extended or adjusted under 35 U.S.C. 154(b) by 531 days.

(21) Appl. No.: 13/020,587

(22) Filed: Feb. 3, 2011

(51) Int. Cl.
*F16D 31/02* (2006.01)
*B60K 6/10* (2006.01)

(52) U.S. Cl.
USPC .......................................... 60/414; 180/165

(58) Field of Classification Search
USPC .................................... 60/413, 414; 180/165
See application file for complete search history.

(56) References Cited

U.S. PATENT DOCUMENTS

| | | | |
|---|---|---|---|
| 4,593,779 A | 6/1986 | Kröhling | |
| D305,746 S | 1/1990 | Allendorph | |
| 5,415,603 A | 5/1995 | Tuzuki et al. | |
| 6,330,498 B2 | 12/2001 | Tamagawa et al. | |
| 6,644,427 B2 | 11/2003 | Schulte | |
| 7,237,634 B2 | 7/2007 | Severinsky et al. | |
| 8,327,637 B2 * | 12/2012 | Loeffler | 60/414 |

* cited by examiner

*Primary Examiner* — Michael Leslie

(57) ABSTRACT

An electric hydraulic motor system for large vehicles. An electric motor and standard fuel engine of the vehicle together create hydraulic pressure via hydraulic pumps. Hydraulic pumps supply the hydraulic motor with hydraulic pressure to drive the wheels of the vehicle in drive mode by reversing the hydraulic flow from the wheels of the vehicle. The standard fuel engine creates hydraulic pressure via hydraulic pumps, both of which supply the hydraulic motor with hydraulic pressure to drive an electric generator and charge the batteries in braking mode. In some embodiments, this alternative system works at low speed than switches to internal combustion engine at high speed.

1 Claim, 2 Drawing Sheets

DRIVE MODE

DRIVE MODE

BRAKING MODE

ELECTRIC HYDRAULIC MOTOR SYSTEM FOR LARGE VEHICLES

FIELD OF THE INVENTION

The present invention is directed to an electric hydraulic motor system for heavy vehicles that has reduced fuel consumption compared to standard vehicle engines.

BACKGROUND OF THE INVENTION

The country's high consumption on oil causes high levels of emissions and pollutants to be released into the atmosphere and leads to a high dependence on foreign oil. The present invention features an electric hydraulic motor system with reduced fuel consumption. The electric hydraulic motor system of the present invention reduces gas emissions and decreases pollution and also operates with less noise and reduces wear on brakes. The system of the present invention may be used in large vehicles, for example semi-trucks and buses or any heavy hauler.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
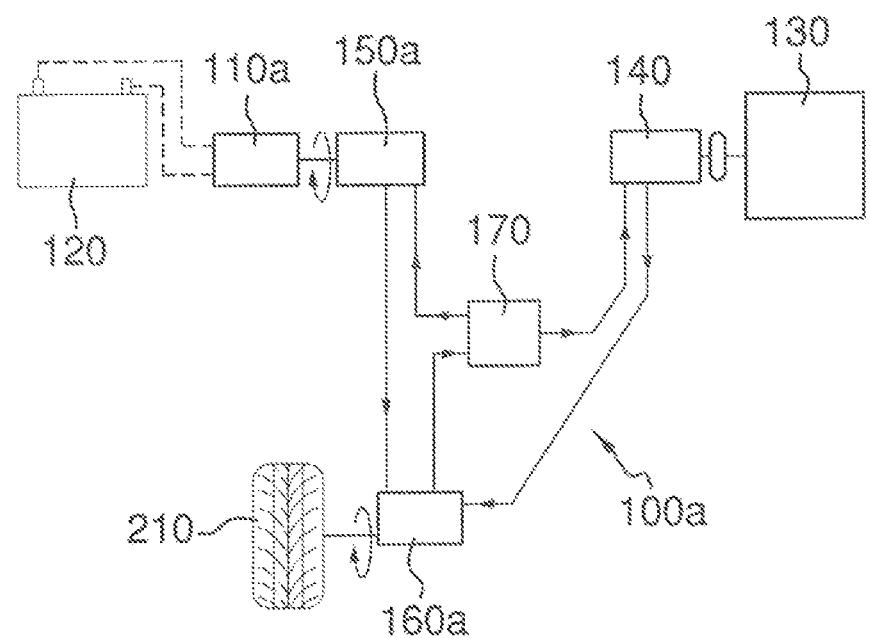
FIG. 1 is a schematic view of the motor system of the present invention (in drive mode).
Figure 2:
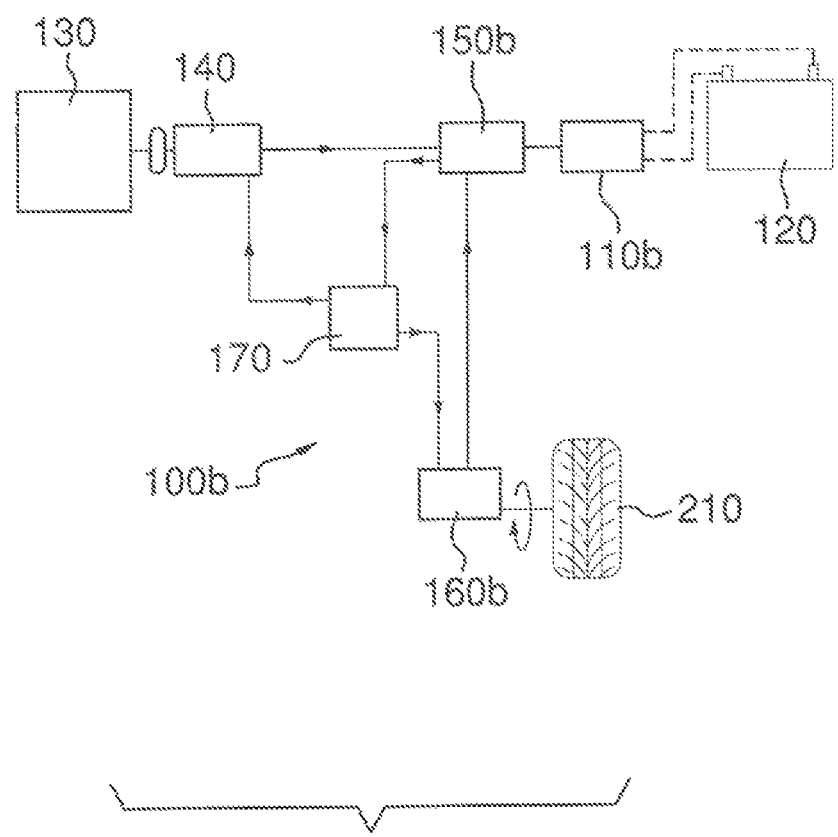
FIG. 2 is a schematic view of the motor system of the present invention (in brake mode).

Referring now to FIG. 1-2, the present invention features an electric hydraulic motor system 100 with reduced fuel consumption. The system 100 of the present invention may be used in large vehicles, for example semi-trucks and buses or any heavy hauler.

The system 100 comprises an electric motor 110a and an electric generator 110b. The electric motor 110a and the electric generator 110b are each operatively connected to the battery 120 of the vehicle (see FIG. 1 and FIG. 2). A fuel engine hydraulic pump 140 is operatively connected to the standard fuel engine 130 of the vehicle and to a hydraulic reservoir 170.

FIG. 1 shows the system 100 in drive mode 100a. A first hydraulic pump 150a is operatively connected to each the electric motor 110a and the hydraulic reservoir 170. A first hydraulic motor 160a is operatively connected to each the wheels 210 of the vehicle, the first hydraulic pump 150a, the hydraulic reservoir 170, and the fuel engine hydraulic pump 140. The first hydraulic motor 160a functions to provide power and drive the wheels 210 of the vehicle (e.g., during drive mode).

FIG. 2 shows the system 100 in braking mode 100b. A second hydraulic motor 150b is operatively connected to each the electric generator 110b, the fuel engine hydraulic pump 140, and the hydraulic reservoir 170. A second hydraulic pump 160b is operatively connected to each the wheels 210 of the vehicle, the second hydraulic motor 150b, and the hydraulic reservoir 170.

The electric motor 110a and standard fuel engine 130 of the vehicle together create hydraulic pressure via hydraulic pumps (e.g., the first hydraulic pump 150a, the fuel engine hydraulic pump 140). In drive mode 100a, hydraulic pumps (e.g., the first hydraulic pump 150a, the fuel engine hydraulic pump 140) supply the hydraulic motor (e.g., the first hydraulic motor 160a) with hydraulic pressure to drive the wheels 210 of the vehicle by reversing the hydraulic flow from the wheels 210 of the vehicle. In braking mode 100b, the standard fuel engine 130 creates hydraulic pressure via hydraulic pumps (e.g., the fuel engine hydraulic pump 140, the second hydraulic pump 160b). The fuel engine hydraulic pump 140 and the second hydraulic pump 160b supply the hydraulic motor (e.g., the second hydraulic motor 150b) with hydraulic pressure to drive the electric generator 110b and charge the battery 120. In braking mode, for example, the battery 120 is charging.

In some embodiments, the batteries of the electric motor 110a can be charged via an external plug-in charger, solar energy panels, or an electric alternator from the mechanical motor. By reversing the hydraulic pressure flow from the engine and wheels to charge the batteries, it slows the vehicle like a braking system.

The disclosures of the following U.S. Patents are incorporated in their entirety by reference herein: U.S. Pat. No. 5,415,603; U.S. Pat. No. 7,237,634; U.S. Pat. No. 6,644,427; U.S. Pat. No. 4,593,779; U.S. Pat. No. 6,330,498; U.S. Design Pat. No. D305,746.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. An electric hydraulic motor system for large vehicles, said system comprising:
   (a) an electric motor 110a and an electric generator 110b, both the electric motor 110a and the electric generator 110b are operatively connected to a battery 120 of a vehicle;
   (b) a fuel engine hydraulic pump 140 operatively connected to a standard fuel engine 130 of the vehicle;
   (c) a hydraulic reservoir 170 operatively connected to the fuel engine hydraulic pump 140;
   (d) a first hydraulic pump 150a operatively connected to each the electric motor 110a and the hydraulic reservoir 170;
   (e) a first hydraulic motor 160a operatively connected to each the first hydraulic pump 150a, the hydraulic reservoir 170, wheels 210 of the vehicle, and the fuel engine hydraulic pump 140;

(f) a second hydraulic motor 150*b* operatively connected to each the electric generator 110*b*, the fuel engine hydraulic pump 140, and the hydraulic reservoir 170; and (g) a second hydraulic pump 160*b* operatively connected to each the wheels 210 of the vehicle, the second hydraulic motor 150*b*, and the hydraulic reservoir 170;

wherein in drive mode the electric motor 110*a* and standard fuel engine 130 of the vehicle together create hydraulic pressure via the first hydraulic pump 150*a* and the fuel engine hydraulic pump 140, the first hydraulic pump 150*a* and the fuel engine hydraulic pump 140 supply the first hydraulic motor 160*a* with hydraulic pressure to drive the wheels 210 of the vehicle;

wherein in braking mode the standard fuel engine 130 creates hydraulic pressure via the fuel engine hydraulic pump 140 and the second hydraulic pump 160*b*, the fuel engine hydraulic pump 140 and the second hydraulic pump 160*b* supply the second hydraulic motor 150*b* with hydraulic pressure to drive the electric generator 110*b* and charge the battery 120 of the vehicle.

\* \* \* \* \*